United States Patent [19]
Schwarz et al.

[11] 3,868,713
[45] Feb. 25, 1975

[54] PHOTOGRAPHIC EXPOSURE SETTING MEANS

[76] Inventors: Gerhard Schwarz, Schaffhauserstr. 12, Munich; Walter Lutz, Bahnhofstr. 11 B, Unterfohring; Rudolf Lang, Birkenstr. 18, Grafing Banhof, all of Germany

[22] Filed: Dec. 18, 1973

[21] Appl. No.: 425,927

[30] Foreign Application Priority Data
Jan. 5, 1973  Germany............................ 7300355

[52] U.S. Cl. .............................................. 354/231
[51] Int. Cl. ............................................. G03b 9/07
[58] Field of Search ................................... 354/231

[56] References Cited
UNITED STATES PATENTS
2,926,589    6/1974    Gebele................................ 354/231

*Primary Examiner*—Samuel S. Matthews
*Assistant Examiner*—Russell E. Adams, Jr.
*Attorney, Agent, or Firm*—Stonebraker & Shepard

[57] ABSTRACT

A coupling arrangement which is particularly simple and easy to manipulate, for coupling a diaphragm aperture setting member to a shutter speed or exposure time setting member, in such a way that these two members may be easily moved in coupled relation to each other by a simple movement of the fingers of one hand, when such joint movement of both setting members is desired, or may be moved separately without being coupled to each other, when separate movement is desired. A coupling slide movable in an axial direction (parallel to the optical axis) serves to couple the two setting members to each other when desired. Spring means tends to move the coupling slide axially in one direction. A radially movable button or plunger moves the coupling slide axially in the opposite direction, against the force of the spring means.

9 Claims, 6 Drawing Figures

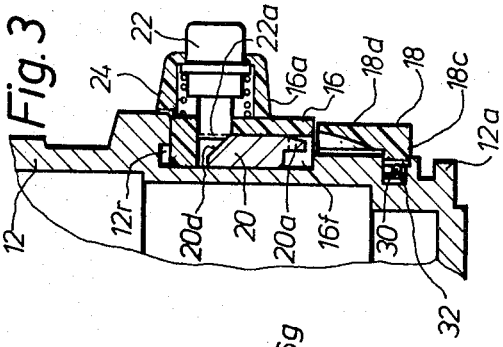
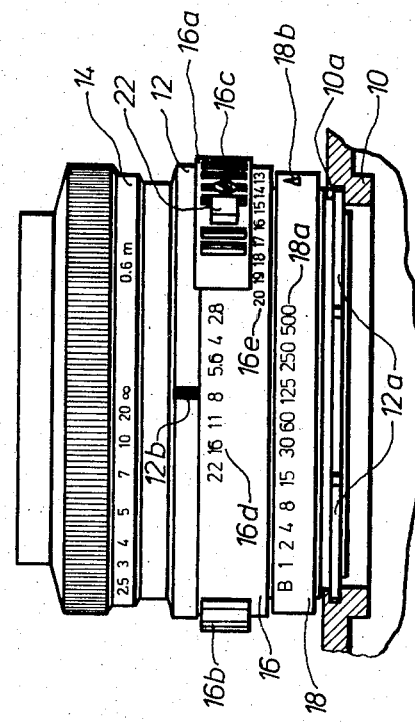
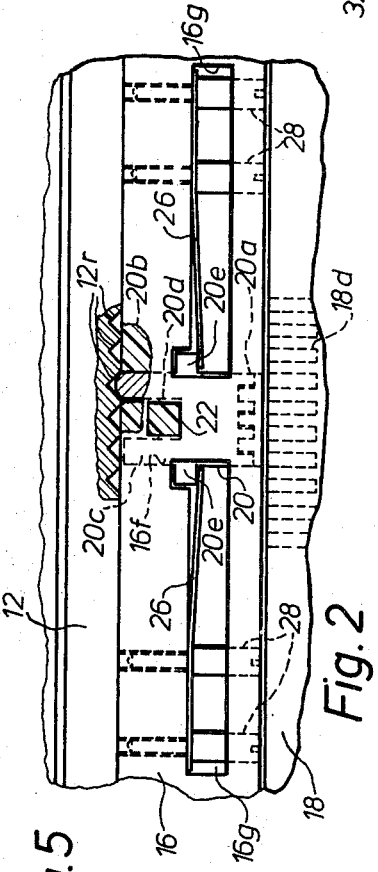
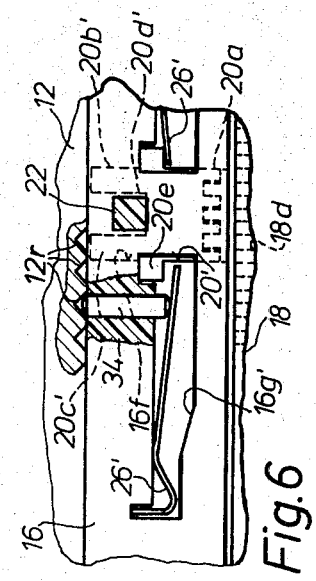
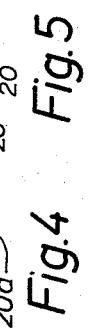
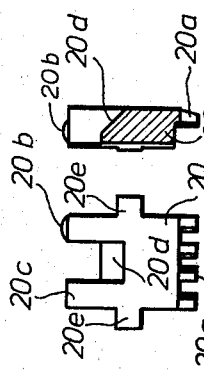

PHOTOGRAPHIC EXPOSURE SETTING MEANS

BACKGROUND OF THE INVENTION

In photographic apparatus such as cameras, it is well known to provide means for coupling a diaphragm aperture setting member to a shutter speed (i.e., shutter time) setting member, in such a way as to move the two setting members jointly in a complementary fashion, while still preserving the same "exposure value." The advantages of such a coupling arrangement, as well as the concept of "exposure value," are fully explained in Gebele U.S. Pat. No. 2,829,574, granted Apr. 8, 1958. A variety of coupling arrangements are disclosed in this Gebele patent, and various other coupling arrangements are disclosed in other patents, such as Gebele and Fahlenberg U.S. Pat. No. 2,887,939, and Gebele U.S. Pat. No. 2,887,940, both granted on May 26, 1959.

The coupling arrangements disclosed in these patents, as well as those known elsewhere in the prior art, are not always easy to manipulate. Sometimes the use of two hands is required when one wishes to change the exposure value, that is, change the relationship of the shutter speed to the diaphragm aperture. Moreover, even in those constructions which may not always require the use of two hands to change the exposure value, the constructions are frequently hard to operate when the photographer is wearing gloves, as may be required in very cold weather; and in some cases the prior constructions, if easy to operate, are difficult and expensive to manufacture.

Accordingly, it is an object of the present invention to provide a generally improved and more satisfactory exposure setting means, and particularly a coupling arrangement for coupling a shutter speed setting member to a diaphragm aperture setting member for conjoint movement, the coupling arrangement being of relatively simple construction, comparatively easy and inexpensive to manufacture, yet being easily and quickly operable by one hand of a photographer, even under adverse conditions such as when wearing thick gloves.

Another object of the invention is the provision of a setting arrangement of such construction as to permit the setting of a desired exposure value (that is, the relationship of shutter speed to diaphragm aperture) by means of a single manual action, the structure being one which is uncomplicated and compact, and which can be manufactured economically.

SUMMARY OF THE INVENTION

The above mentioned objects are achieved in accordance with the present invention by the fact that the coupling means is in the form of a slide mounted on one of the setting members for displacement in an axial direction, that is, in a direction parallel to the optical axis of the optical unit (lens unit or shutter unit or combined lens and shutter unit) with which the invention is used, the coupling slide having coupling teeth at one end, and being biased at least at one of its two longitudinal sides by one end of a leaf spring which is disposed approximately tangentially to the optical axis and is secured at its other end in the same setting member on which the slide is mounted. An operating member is guided for displacement in the same setting member, at right angles to the optical axis, this operating member having an inclined actuating surface which cooperates with a correspondingly inclined actuating surface on the slide, so that when radial pressure is applied to the operating member, the slide is axially displaced so that coupling teeth on the slide make or break engagement with corresponding coupling teeth on the other setting member.

In a preferred embodiment of the invention, the coupling slide is mounted on the diaphragm aperture setting ring, and when radial pressure is applied to the operating member, the coupling teeth of the slide engage with corresponding coupling teeth on the shutter speed setting ring of the optical unit.

It is of particular advantage to provide, in the preferred arrangement just mentioned, a detent pin mounted on the diaphragm aperture setting ring, this pin being displaceable in a direction parallel to the optical axis, and being adapted to be pressed by one of the leaf springs which act on the coupling slide, into a detent notch in a fixed housing part. The diaphragm setting ring is equipped with at least one finger piece of such form as to be easily grasped manually when the ring is to be turned. It is also useful if the time setting ring (shutter speed setting ring), which has no such finger piece, has associated therewith a ratchet arrangement, in particular a spring pressed ratchet or "click detent" which tends to hold the shutter speed setting ring frictionally in the selective position at which it has been set, but which permits it to be turned to another position by exerting sufficient force to overcome the slight holding power of the click arrangement.

A particularly advantageous arrangement is achieved when the operating member is disposed in a finger piece of the diaphragm aperture setting ring and is biased by a spring which seeks to break the engagement between the operating member and the slide.

BRIEF DESCRIPTION OF THE DRAWINGS

FIG. 1 is a plan of an optical unit, with a fragment of an associated camera shown in horizontal section;

FIG. 2 is a partial plan view of the same construction, on a larger scale, with parts broken away to show interior parts, and with parts in section;

FIG. 3 is a radial section through the preferred construction, on a larger scale;

FIG. 4 is a plan of a preferred form of the coupling slide, detached from other parts;

FIG. 5 is a cross section through the same; and

FIG. 6 is a view similar to a fragment of FIG. 2, illustrating another embodiment of the invention.

DESCRIPTION OF THE PREFERRED EMBODIMENTS

The present invention is useful in any type of photographic apparatus where there is means for adjusting both a diaphragm aperture and a duration of exposure. The invention fines its greatest usefulness in photographic cameras, but other uses are possible, as for example photographic enlargers.

The invention is here illustrated in the form of a lens and shutter unit interchangeably mounted on the front of a camera. This optical unit (which is conventional and well known in the art, except for the coupling means of the present invention) contains the conventional lens (not shown), the conventional adjustable diaphragm, usually an iris diaphragm (not shown), and the conventional objective shutter (also not shown). But if it is desired to use the invention in connection with a focal plane shutter rather than an objective shutter, all that is needed is to provide any suitable mechanical connection of conventional kind from the shutter speed adjusting ring on the lens mount to the shutter speed adjusting member of the focal plane shutter on the camera body.

Referring now to the FIGS. 1–3, a fragment of a conventional camera, not otherwise shown, is indicated at 10. As usual on cameras equipped to receive interchangeable optical units (interchangeable lenses) the camera body is provided with a number of bayonet projections 10a circumferentially spaced around the opening in the front of the camera body. The interchangeable lens unit or optical unit indicated in general at 12 has corresponding bayonet lugs 12a which mate with the bayonet projections 10a on the camera body, to hold the interchangeable lens on the front of the camera. This is illustrated merely as an example. It is wholly immaterial to the present invention whether the optical unit is permanently mounted in fixed position on the camera body, or whether it is interchangeable.

The lens mount 12 carries near its front end the usual conventional rotatable focusing ring 14 used for setting the focus of the lens. As already indicated, a suitable adjustable diaphragm arrangement, for example an iris diaphragm, is also mounted in the unit 12, at an appropriate place between the various components or elements of the lens, and is coupled in the conventional way to a manually rotatable setting ring or diaphragm aperture adjusting ring 16 which, like the focusing ring 14, is rotatable about the optical axis passing through the center of the mount 12. Secured to the periphery of the diaphragm aperture setting ring 16, approximately diametrically opposite to one another, are two operating finger pieces 16a and 16b, held in place, for example, by means of screws 16c. A diaphragm aperture scale 16d is marked on the periphery of the ring 16, and is read in conjunction with a fixed index mark 12b on the mount 12.

A time setting ring or shutter speed setting ring 18 is also mounted for rotation of the holder 12, about the optical axis as a center, this shutter speed adjusting ring being mounted just to the rear of the diaphragm aperture ring 16. The speed setting ring 18 is provided with a shutter speed scale 18a which is also read in conjunction with the index mark 12b.

In addition to the diaphragm aperture scale 16d, the diaphragm setting ring 16 also carries an exposure value scale 16e, read in conjunction with an index mark 18b on the speed setting ring 18. Exposure value represents a relationship between diaphragm aperture and shutter speed, rather than absolute values of either aperture or speed. The use of an exposure value in setting the variable exposure factors is well known in the art, but for those who do not happen to be already familiar with it, a full understanding may be obtained by reading the three patents above mentioned.

The time setting or shutter speed setting ring is coupled with the speed regulating arrangement of the camera shutter in any appropriate known manner, not illustrated. If the shutter is in the camera body rather than in the detachable optical unit (as for example in the case of a focal plane shutter) it is only necessary to have a detachable connection in a gear train between the speed setting ring 18 on the optical unit and the speed setting member on the camera body, which detachable connection can be released or disengaged when the lens is being changed.

In the first embodiment, illustrated in FIGS. 2 and 3, a guide groove 16f is provided in the interior of the diaphragm setting ring 16, this groove extending in an axial direction, that is, in a direction parallel to the optical axis. A flat coupling slide 20, seen in detail in FIGS. 4 and 5, is mounted in this groove for movement in the axial direction. This slide 20 is provided at one end with a set of teeth 20a to be used in making the required coupling with the shutter speed setting ring. At its other end, the slide 20 is forked and has two projections 20b and 20c. Between these two projections there is an inclined surface 20d which may be described as a cam surface. In addition, the slide 20 has a nose or abutment lug 20e at each of the two longitudinal sides of the slide.

An operating element in the form of a press button or plunger 22 is mounted in the finger piece 16a and is guided for movement radially with respect to the optical axis. A spring 24 (FIG. 3) urges the element 22 in an outward direction to its normal rest position. The inner end of the element 22 is provided with an oblique or inclined cam surface 22a which cooperates with the inclined cam surface 20d on the coupling slide 20. As can be seen in FIG. 1, the head of the button 22 is of rectangular form (preferably square) to prevent rotation of the button, thereby keeping the inclined cam surface 22a thereof properly oriented in relation to the cam surface 20d of the coupling slide. These two cam surfaces 20d and 22a are at an angle of about 45° to the optical axis, so that when radial inward pressure is applied to the operating element 22, the slide 20 is moved in a rearward axial direction, that is, toward the shutter speed setting ring 18.

The projection 20b of the coupling slide 20 is rounded at its end, and engages in one or another of a set of notches 12r in a rearwardly faced radial shoulder of the mount or unit 12. This provides detent means for holding the setting ring 16 against accidental rotation relative to the mount or unit 12. A leaf spring 26 is arranged at each longitudinal side of the slide 20, each spring being in a tangentially extending groove 16g at the inner edge of the setting ring 16. At their ends remote from the slide 20, the respective springs 26 are connected to the ring 16 by screws 28. The free inner ends of the respective springs 26, that is, the ends which are resilient in a direction parallel to the optical axis, bear against the rear faces of the respective noses or lugs 20e on the sides of the coupling slide 20, and urge the coupling slide in a forward axial direction, tending to keep the rounded projection 20b engaged in whichever one of the notches 12r happens to be opposite it. When the operating member or botton 22 is pressed radially inwardly, the cooperating cam surface 22a and 20d move the coupling slide 20 in a rearward axial direction, against the force of the springs 26, removing the rounded end 20b from a notch 12r and engaging the teeth 20a at the rear end of the slide 20 with teeth 18d formed in the forward part of the shutter speed setting or time setting ring 18. These notches 18d are conveniently machined in the inner forward corner of the ring 18, as will be seen from FIG. 3.

A ratchet arrangement or click arrangement is provided for the speed setting ring 18. This is formed conveniently by a ball 30 (FIG. 3) in a radial recess in the lens mount 12, the ball being pressed radially outwardly by a leaf spring 32 in the mount 12, so that the ball engages in one or another of a series of notches 18c formed on the inner face of the ring 18. This spring detent or ratchet arrangement tends to hold the ring 18 against rotation on the mount 12, preventing accidental rotation, but of course the ring 18 can be rotated by exerting sufficient circumferential force to overcome the holding power of the detent or ratchet arrangement.

Each of the setting rings 16 and 18 can be rotated individually and can be brought to a required setting position, monitored or determined by means of the associated scales. The relative rotary position of the two rings with respect to each other, rather than the absolute position of either one, determines the setting of the exposure value, which can be seen by observing the exposure value scale 16e with respect to the index mark 18b. This provides a specific pairing of the diaphragm aperture and the shutter speed with relation to the main index mark 12b. For example, with the parts in the setting position indicated in FIG. 1, the rings are set for an exposure value of 13, a diaphragm aperture of f/8, and an exposure time of 1/125th of a second.

If the user wishes to set a different pairing while still maintaining the same exposure value of 13, for example, to set a diaphragm aperture of f/5.6 and a time of 1/250, he has only to press the operating button 22 radially inwardly with one finger, thereby moving the coupling slide 20 rearwardly, to effect a coupling engagement between the parts 16, 20, and 18. This movement of the slide 20 releases the engagement at 12r, 20b. The user can now turn the rings 16 and 18 together in their coupled condition, thereby setting the required new pairing in relation to the index mark 12b, but without altering the exposure value. This movement is very easy and quick, even for a person wearing thick gloves, as it is only necessary to press radially inwardly on the button 22 with one finger, while engaging the thumb with the opposite operating piece 16b and exerting a rotary or twisting force. Or conversely, of course, the thumb can be used to press the button 22 radially inwardly, while a finger engages the opposite finger piece 16b on the opposite side of the unit.

During this rotary movement, the detent projections 20b and 30 are lifted or sprung out of the associated notches 12r and 18c respectively, and slide under the action or springs 26 and 32 into the respective new notches when the turning motion is stopped and the inward radial pressure on the button 22 is removed. When the setting has been completed and the pressure on the button is released, the rings 16 and 18 are again uncoupled for each other, and held against accidental turning by the detents and notches above described.

In this arrangement, it is sufficient to have finger pieces 16a and 16b only on the diaphragm aperture setting ring 16, no such finger pieces being necessary on the shutter speed setting ring 18 because the speed setting ring can always be turned to the required position by coupling it temporarily to the aperture setting ring. Then the diaphragm can be turned by itself to its desired location, without turning the speed ring 18 with it. This can be accomplished by pressing the button 22 only partially inwardly, sufficiently to move the slide 20 rearwardly enough to disengage from the notches 12r, but not far enough to engage with the notches 18d of the speed setting ring. Or, alternatively, the diaphragm ring 16 can be turned by itself without pressing the button 22 inwardly, simply exerting enough turning force on the finger pieces 16a and 16b to cause the rounded projection 20b to cam itself out of the holding notches 12r and to cause it to ratchet along from one notch to another, which will move the slide slightly rearwardly as it is cammed out of each notch, but not far enough to make coupling engagement with the ring 18.

Another embodiment of the invention is illustrated in FIG. 6. This differs from the first embodiment in that the coupling slide 20' no longer engages in the detent notches 12r, but the detent coupling between the ring 16 and the fixed part of the mount 12 is here provided by a special detent pin 34 mounted in the diaphragm aperture setting ring 16 for displacement in a direction parallel to the optical axis. One of the springs 26' presses the detent pin 34 into one of the notches 12r. When the slide 20' moves rearwardly as a result of inward radial pressure on the operating button 22, one of the lateral lugs 20e on the slide engages the end of the spring 26' which cooperates with the pin 34, and moves this end of the spring rearwardly to relieve the pressure on the pin 34.

Another difference between the embodiment illustrated in FIG. 6 and the previous embodiment is in the mounting of the springs 26'. Again these springs are disposed in a generally tangential direction, but instead of being firmly screwed to the ring 16 as in the previous embodiment, they are held non-positively in their repective grooves 16g' by having their ends bent in the manner illustrated in FIG. 6, the ends being inserted in narrow parts of the respective grooves and in axially extending notches, as illustrated.

All of the setting rings and also the coupling slide may be accurately and readily made, for example as injection moldings from thermoplastically moldable plastic material. The setting rings 16 and 18 are advantageously split at a position around their periphery, and take the form of resilient spring rings, to enable them to be sprung into the associated guide grooves at the periphery of the mount or holder 12. Setting rings made in this way are held in the required accurate circular form when in their operative condition, by suitable means (not shown), for example, by scale rings or segments or the like.

Finally, it is noted that it is entirely optional as to which direction the springs urge the coupling slide 20. In the embodiments illustrated, the springs urge the coupling slide 20. In the embodiments illustrated, the springs urge the coupling slide forwardly to an uncoupled position, and coupling is accomplished by pressing the button 22. It is equally possible to have the springs urge the coupling slide rearwardly so that coupling is normally effective between the rings 16 and 18, the button 22 being pressed when it is desired to uncouple the parts in order to set them for a different exposure value.

Also it is noted that the coupling slide is mounted on the aperture setting ring 16, in the embodiments here illustrated, as it is believed that this is usually the best arrangement. But if desired, the coupling slide as well as the finger pieces for producing rotation, can be mounted on the shutter speed setting ring 18 rather than the diaphragm aperture setting ring 16, the same coupling result being achieved.

What is claimed is:

1. Photographic apparatus comprising a mounting part having an optical axis, a diaphragm aperture setting member and an exposure time setting member both mounted on said mounting part for movement relative thereto and relative to each other, a coupling slide mounted on said diaphragm aperture setting member for movement in a direction parallel to said optical axis and transverse to the directions of movement of said setting members, coupling teeth at one end of said slide, cooperating coupling teeth on said time setting member, spring means tending to move said coupling slide in one direction, an operating member mounted on said first setting member for movement in a direction radially with respect to said optical axis, and cooperating inclined surfaces on said slide and said operating member, so formed that when said operating member is displaced radially, said slide is moved in a direction parallel to said optical axis to alter the cooperative relation of the teeth on the slide to the teeth on said second setting member, radial inward displacement of said operating member causing the teeth on said slide to engage the coupling teeth on the time setting member.

2. Apparatus as defined in claim 1, wherein said spring means includes a leaf spring.

3. Apparatus as defined in claim 2, further comprising at least one finger piece on said diaphragm setting member, a series of detent notches in said mounting part, and a detent pin mounted in said diaphragm setting member for movement parallel to said optical axis, said leaf spring tending to press said pin into engagement with one of said detent notches.

4. Apparatus as defined in claim 1, wherein said setting members are in the form of rings rotatable on said mounting part about the optical axis as a center.

5. Apparatus as defined in claim 4, further comprising resilient detent means tending to hold the time setting ring against rotation.

6. Apparatus as defined in claim 4, further comprising a finger piece on the diaphragm setting ring, said operating member being mounted in said finger piece, and spring means biasing said operating member in a direction seeking to break engagement between said operating member and said slide.

7. Apparatus as defined in claim 1, wherein there is a series of ratchet notches in said mounting part, and said slide has a projection for cooperation with said notches, said spring means tending to move said slide to a position where, the projection thereof engages one of said notches.

8. Apparatus as defined in claim 1, wherein said spring means comprises at least one leaf spring, and wherein said spring has one end rigidly secured by screws in a groove in said diaphragm setting member.

9. Apparatus as defined in claim 1, wherein said spring means comprises at least one leaf spring, and wherein said spring has one end non-positively fitted in a groove in said diaphragm setting member and held in operative position thereby.

* * * * *

PO-1050
(5/69)

UNITED STATES PATENT OFFICE
CERTIFICATE OF CORRECTION

Patent No. 3,868,713  Dated February 25, 1975

Inventor(s) Gerhard Schwarz, Walter Lutz, and Rudolf Lang

It is certified that error appears in the above-identified patent and that said Letters Patent are hereby corrected as shown below:

On the cover sheet insert -- 73 Assignee:

Compur-Werk Gesellschaft mit beschränkter Haftung & Co., Munich, Germany, a German firm --.

Signed and sealed this 13th day of May 1975.

(SEAL)
Attest:

RUTH C. MASON
Attesting Officer

C. MARSHALL DANN
Commissioner of Patents
and Trademarks